June 28, 1966
R. M. WILMOTTE
3,258,600
BINARY SCALER USING PHOTORESPONSIVE
ELEMENTS AND VARIABLE LIGHT SOURCES
Filed Sept. 8, 1959
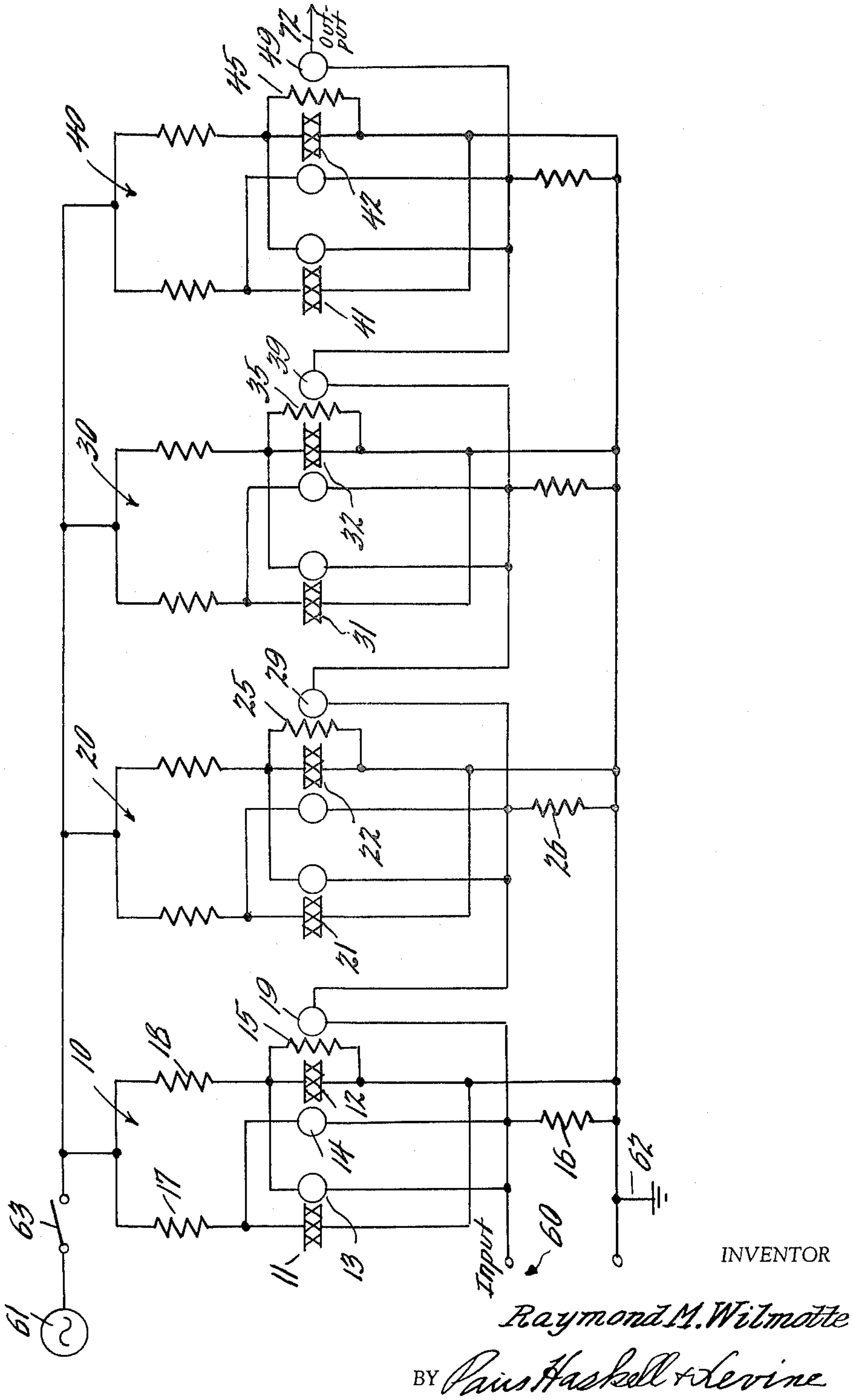
INVENTOR
Raymond M. Wilmotte
BY Pains Haskell & Levine
ATTORNEYS United States Patent Office 3,258,600

Patented June 28, 1966

3,258,600

BINARY SCALER USING PHOTORESPONSIVE ELEMENTS AND VARIABLE LIGHT SOURCES

Raymond M. Wilmotte, Princeton, N.J.
(4719 Sedgwick St. NW., Washington, D.C. 20016)

Filed Sept. 8, 1959, Ser. No. 838,450
12 Claims. (Cl. 250—209)

The present invention relates to electrical counter circuits of the binary scaler type, and more particularly is concerned with such circuits wherein the basic components are couples of photoresponsive elements and variable light sources. The present invention is related to my copending application S.N. 620,831, filed November 7, 1956, and is also related to a copending application S.N. 607,770, now Patent No. 3,214,592, filed September 4, 1956, by myself and Robert L. Carnine, jointly.

In their preferred, and what is presently considered their most practical embodiments for the present purposes, the aforementioned couples comprise photoconductors, such as cadmium sulfide crystals, as the photoresponsive elements, and light transmitting electroluminescent condensers, or cells, as the variable light sources. Photoconductors in the form of suitably activated cadmium sulfide crystals are well known, and such elements can be readily formed possessing relatively wide ranges of photoresponse and time characteristics to illumination. Light transmitting electroluminescent condensers are also well known, and in their more usual form possess the property of emitting light in proportion to the magnitude of A.C. voltage impressed thereacross. These electroluminescent condensers also have the property of a threshold voltage, below which the condensers remain substantially dark or non-luminant.

In accordance with the present invention, by appropriate electrical and luminance coupling of electric signal responsive variable light sources and photoresponsive elements, such as the types above referred to, circuits can be formed broadly functionally equivalent to conventional counters, such as vacuum tube and magnetic counters.

The present invention being directed to counter circuits of the binary scaler type, it comprises the combination of a plurality of units or stages appropriately interrelated or coupled to perform a logical function, particularly the counting of input signals or pulses on the binary scale. Each of the units or stages includes a flip-flop or scale-of-two circuit formed from two variable light sources and two photoresponsive elements appropriately coupled to said light sources optically and electrically, to impart to the unit or stage two stable states—a "0" state with a first of the light sources luminant and the other non-luminant, and a "1" state with said first light source non-luminant and said other luminant. Each such stage is adapted to be switched from its existing stable state to its other stable state upon the application of each input pulse thereto. Further, appropriate photoresponsive carry circuits are associated with each stage so as to couple any input pulse applied to a given stage to the next succeeding stage when the given stage is in the "1" state at the time said input pulse is applied thereto, but not to couple such input pulse to the next stage when the given stage is in the "0" state. Thus, in accordance with usual binary scaler operation, any pulse applied to the input or first stage of the counter is coupled through all successive stages having a "1" state to the first stage of the counter having a "0" state, and in this process, the input pulse causes each stage through which it is coupled and said first "0" state stage to switch to its other stable state.

It is accordingly one object of the present invention to provide a novel counter circuit.

Another object of the present invention is to provide such a circuit utilizing electric signal responsive variable light sources coupled with photoresponsive elements as the basic components of the circuit.

Another object of the present invention is to provide such a circuit utilizing electroluminescent condensers or cells and photoconductors as the basic components of the circuit.

Still another object of the present invention is to provide a circuit which is broadly functionally equivalent to conventional counters, wherein photoconductors and light transmitting electroluminescent condensers are utilized as the basic components of the circuit.

And an additional object of the present invention is to provide a counter of the binary scaler type, in which the basic elements or components of the circuit are photoresponsive elements and variable light sources electrically and optically coupled together, particularly where said photoresponsive elements are solid state photoconductors, and said light sources are solid state electroluminescent cells or capacitors.

Other objects and advantages of the present invention will become apparent to those skilled in the art from a consideration of the following detailed description of an exemplary specific embodiment thereof, had in conjunction with the accompanying drawing which is a schematic presentation of this embodiment.

Referring to the drawing, the counter there illustrated comprises four identical binary stages 10, 20, 30, and 40. Binary stage 10 comprises two arms in electrical parallel relationship between an A.C. bias source 61 and ground 62. One arm includes the electrical series elements of resistor 17 and electroluminescent cell or capacitor 11, and the other arm includes the electrical series elements of resistor 18 and electroluminescent cell or capacitor 12. In addition photoconductor 14 is connected in electrical parallel relationship with cell 11 with respect to the bias source 61, and is optically coupled to cell 12. Correspondingly, photoconductor 13 is connected in electrical parallel relationship with cell 12 with respect to the bias source 61, and is optically coupled to cell 11. The network thus far described by stage 10 constitutes a flip-flop circuit, as will become apparent from the subsequent description of its operation. In order to introduce a prescribed or planned asymmetry into this flip-flop circuit, a resistor 15 is connected across cell 12.

Thus, with regard to stage 10, when the bias voltage 61 is initially applied to the circuit, as by closing switch 63, stage 10 assumes the stable state of cell 11 luminant and cell 12 extinguished. This result is accomplished by choosing the parameters of the circuit so that when switch 63 is initially closed, the voltages across cells 11 and 12 from the bias source 61 are both in excess of their threshold values. However, because of the unbalance caused by resistor 15, the voltage across cell 11 is greater than that across cell 12, hence cell 11 luminesces more brilliantly than cell 12. As these cells 11 and 12 luminesce, their respective optical couplings with photoconductors 13 and 14 cause the resistances of these photoconductors to decrease. Since cell 11 is luminescing more brilliantly than cell 12, photoconductor 13 tends to decrease to a lower resistance and faster than photoconductor 14. As a result, the decrease in resistance of photoconductor 13 causes the voltage applied across cell 12 to drop below its threshold value, and cell 12 becomes non-luminant. The optical coupling between cell 12 and photoconductor 14 initially has a similar effect on cell 11, but since cell 11 starts from a more brilliant or higher voltage condition than cell 12, cell 11 does not become extinguished and the stage 10 soon reaches the stable state of cell 11 luminant and cell 12 non-luminant or extinguished. With cell 12 extinguished, photoconductor 14 soon attains its full impedance value, and cell 11 attains its full luminance under the bias voltage. This stable state of the binary stage 10 is identified as the "0" state.

Each of the stages 20, 30, and 40 are identical to stage 10, both in structure and response to the bias voltage. Therefore the structure and response of these stages is apparent from the foregoing, and will not be specifically described.

The input of pulses to be counted by the counter is effected through input terminals 60. An input pulse at 60 is applied to stage 10 across resistor 16. Considering stage 10 to be in the stable state "0" above-defined, cell 11 is luminant and illuminating photoconductor 13, while cell 12 is non-luminant and hence photoconductor 14 is not illuminated. Photoconductor 13 is therefore a relatively low impedance and photoconductor 14 is a relatively high impedance. Since the input pulse is coupled to each of said cells through its respective photoconductor in electrical series with it with respect to the input source (series circuit 60, 13, 12, to ground, and series circuit 60, 14, 11, to ground), a much greater voltage from the input pulse is passed by photoconductor 13 and applied across cell 12 than is passed by photoconductor 14 and applied across cell 11. The input pulse should be of sufficient value to render cell 12 substantially more luminant than cell 11. The duration of this input pulse is timed in accordance with the time characteristics of the photoconductors, to terminate at a time that renders photoconductor 14 more conductive than photoconductor 13 as a result of the input pulse. This residual unbalance in the flip-flop circuit overrides the unbalance due to resistor 15, and results in a dominant luminance of cell 12 over cell 11, and the establishment of stable state "1" in stage 10, with cell 12 fully luminant from the bias source 61 and cell 11 extinguished, it being shunted by the low impedance of the illuminated photoconductor 14. Similarly, if stage 10 is in the "1" state with cell 12 luminant and cell 11 non-luminant, from the foregoing it is apparent that upon the application of an input pulse at 60 the stage is caused to switch to the "0" state with cell 11 luminant and cell 12 extinguished.

The transfer, carry or coupling circuit between stage 10 and stage 20 comprises the photoconductor 19 optically coupled to the cell 12. At the same time stage 10 was in the "0" state and the input pulse was applied to the counter, as above-described, cell 12 was originally non-luminant. Accordingly photoconductor 19 was a relatively high resistance, and the input pulse was not passed to stage 20 with sufficient amplitude to affect this stage. However, when stage 10 is in the "1" state, the luminance of cell 12 illuminates photoconductor 19, and thus reduces its impedance so that the next pulse in at 60 does affect the stage 20 binary flip-flop. Considering stage 10 to be in the stable state "1," the next pulse in at 60 is applied to stage 10 across resistor 16, and being passed by photoconductor 19, is simultaneously applied to stage 20 across resistor 26, but is not passed by photoconductor 29 because stage 20 has been in the "0" state with cell 22 non-luminant. Since at this time photoconductor 14 in stage 10 is a low impedance and photoconductor 13 is a high impedance, the input pulse causes cell 11 to luminesce very brilliantly, and upon termination of the pulse, in view of what has been said above, it is apparent that stage 10 switches states to the stable "0" state, with cell 11 luminant and cell 12 extinguished. At the same time, since stage 20 is originally in the "0" state, this input pulse across resistor 26 causes stage 20 to switch to the "1" state.

Thus, with a plurality of identical flip-flop binary stages 10, 20, 30, and 40, each similarly connected to a bias voltage source 61, the initial condition of each stage, as determined by the planned asymmetry effected by resistors 15, 25, 35, and 45, is established in the stable "0" state with cells 11, 21, 31, and 41 luminant, and cells 12, 22, 32, and 42 non-luminant. The first input pulse at 60 is coupled through photoconductors 13 and 14 to cells 12 and 11 respectively, causing stage 10 to switch from "0" state to "1" state. Since photoconductor 19 had not been previously illuminated, the input pulse is not effectively coupled to stage 20. With illumination of photoconductor 19 by cell 12, the second input pulse at 60 is effectively applied both to stage 10 and stage 20, but not beyond stage 20, due to the high impedance of photoconductor 29. This second pulse therefore causes stages 10 and 20 to shift states, resulting in stage 10 going to the "0" state and stage 20 going to the"1" state. Photoconductor 19 being non-illuminated at this time, the third pulse in at 60 is effectively applied only to stage 10, causing it to return to the "1" state. With stages 10 and 20 both in the "1" state, photoconductors 19 and 29 are both illuminated, hence the fourth pulse in at 60 is applied to stages 10, 20 and 30, causing stages 10 and 20 both to switch from "1" states to "0" states, and causing stage 30 to switch to the "1" state. The fifth pulse in at 60 causes stage 10 to switch from the "0" to the "1" state, and will not affect any of the other stages because photoconductor 19 was not illuminated while stage 10 was in the "0" state. The further response of the present circuit to continued input pulses at 60 will be apparent to those skilled in the art from the foregoing description, the result being the same as in conventional binary scalers, and the count of pulses applied to the circuit being indicated in binary notation by the luminance condition of the stage cells 11–12, 21–22, 31–32, and 41–42.

The illustrated counter is provided with four stages, 10, 20, 30, and 40. It is understood, however, that any desired number of stages could be employed. Regardless of the number of stages employed in a register, it is frequently desired to shift the full count of one register as a unit count in the next higher order register, and at the same time to reset the lower order register to zero. This is accomplished automatically in the counter of the present invention. Assuming that fifteen input pulses had been applied to the present four stage counter, each stage would be in the "1" state. The sixteenth input pulse will therefore be applied to stage 10, passed by photoconductor 19 and applied to stage 20, passed by photoconductor 29 and applied to stage 30, passed by photoconductor 39 and applied to stage 40, and passed by photoconductor 49 and applied to output 72. Output 72 may constitute the input to the next higher order register, and thus the sixteenth pulse in at 60 would register a unit count in such next higher order register. At the same time, this pulse having been applied to each of the stages 10, 20, 30, and 40, it has caused them all to switch from their "1" states to their "0" states, thus completely resetting the counter to start a new count of input pulses. Of course, the counter can be reset at any time by opening switch 63 long enough for all the elements to reach a stable nonenergized condition, and closing the switch. All the stages will then assume a "0" states in accordance with their planned asymmetry.

Accordingly, by the present invention there is provided a counter, comprised of variable light source-photoresponsive element couples, wherein the counter is of the binary scaler type, having a plurality of binary flip-flop stages, with carry or coupling circuits interrelating the several stages, to provide a count in binary notation of the number of pulses applied to the input of the counter. Having presented one specific exemplary embodiment of the invention, it is understood that the scope of the invention is not limited thereto, for changes, modifications, and variations will be apparent to those skilled in the art. And such changes, modifications, and variations as are embraced by the spirit and scope of the appended claims are contemplated as within the purview of the present invention.

What is claimed is:

1. A binary scaler comprising at least three binary stages; each stage including a bi-stable circuit cyclically operable between a first and a second stable state, and an input means for each said circuit; and a plurality of carry means, one for each two successive stages interrelating said two stages; each said circuit comprising voltage responsive variable light means and photoresponsive means electrically and optically coupled to said light means; said light means and photoresponsive means of each said circuit cooperating in response to successive input signals applied to the respective input means to effect said cyclical operation, one cycle of operation for each pair of input signals applied to said respective input means; said first and second stable states being defined by different states of said light means; and each said carry means including means optically coupled with said light means of the earlier of its respective two stages for coupling an input signal to the input means of the later of its respective two stages along with the application of an input signal to the input means of said earlier stage, only when said earlier stage is in said second stable state at the time of application of the last-mentioned input signal.

2. A binary scaler as set forth in claim 1, wherein said optically coupled means of each carry means comprises a photoresponsive element.

3. A binary scaler as set forth in claim 2: further including an input means for the scaler associated with the first stage; and wherein all the carry means are connected together in electrical series, with respect to said signal input means for the scaler, whereby a signal input to said input means for the scaler is applied to successive circuit input means in accordance with the response of said carry means.

4. A binary scaler comprising at least three binary stages; each stage including a bi-stable circuit cyclically operable between a first and a second stable state, and an input means for each said circuit; and a plurality of carry means, one for each two successive stages interrelating said two stages; each said circuit comprising two voltage responsive variable light sources and at least one photoresponsive element electrically coupled to one light source and optically coupled to the other light source; said light sources and photoresponsive element of each said circuit cooperating in response to successive input signals applied to the respective input means to effect said cyclical operation, one cycle of operation for each pair of input signals supplied to said respective input means; said first and second stable states being defined by different states of said light sources; and each said carry means including means optically coupled with one of said light sources of the earlier of its respective two stages for coupling an input signal to the input means of the later of its respective two stages along with the application of an input signal to the input means of said earlier stage, only when said earlier stage is in said second stable state at the time of application of the last-mentioned input signal.

5. A binary scaler as set forth in claim 4, wherein said optically coupled means of each carry means comprises a photoresponsive element.

6. A binary scaler as set forth in claim 5; further including an input means for the scaler associated with the first stage; and wherein all the carry means are connected together in electrical series, with respect to said signal input means for the scaler, whereby a signal input to said input means for the scaler is applied to successive circuit input means in accordance with the response of said carry means.

7. A binary scaler comprising at least three binary stages; each stage including a bi-stable circuit cyclically operable between a first and a second stable state, and an input means for each said circuit; and a plurality of carry means, one for each two successive stages interrelating said two stages; each said circuit comprising two voltage responsive variable light sources and two photoresponsive elements, one of said elements being connected electrically across one of said sources and being optically coupled to the other of said sources, the other of said elements being connected electrically to said other of said sources and being optically coupled to said one of said sources, said light sources and photoresponsive elements of each said circuit cooperating in response to successive input signals applied to the respective input means to effect said cyclical operation, one cycle of operation for each pair of input signals applied to said respective input means; said first and second stable states being defined by different states of said light sources; and each said carry means including a photoresponsive element optically coupled with said other of said light sources of the earlier of its respective two stages for coupling an input signal to the input means of the later of its respective two stages along with the application of an input signal to the input means of said earlier stage, only when said earlier stage is in said second stable state at the time of application of the last-mentioned input signal.

8. A binary scaler as set forth in claim 7: further including an input means for the scaler associated with the first stage; and wherein all the carry means are connected together in electrical series, with respect to said signal input means for the scaler, whereby input to said input means for said scaler is applied to successive circuit input means in accordance with the response of said carry means.

9. A binary scaler comprising a plurality of stages; each stage including a bi-stable circuit cyclically operable between a first and a second stable state, and an input means for each said circuit; and a carry means for each two successive stages interrelating said two stages; each said circuit comprising two voltage responsive variable light sources and two photoresponsive elements, one of said elements being connected electrically across one of said sources and being optically coupled to the other of said sources, the other of said elements being connected electrically across said other of said sources and being optically coupled to said one of said sources; said input means comprising means for applying an input signal simultaneously across said one element and said one source in electrical series with respect thereto, and across said other element and said other source in electrical series with respect thereto; said light sources and photoresponsive elements of each said circuit cooperating in response to successive input signals applied to the respective input means to effect said cyclical operation, one cycle of operation for each pair of input signals applied to said respective input means; said first and second stable stages being defined by different states of said light sources; and each said carry means including a photoresponsive element optically coupled with said other of said light sources of the earlier of its respective two stages for coupling an input signal to the input means of the later of its respective two stages along with the application of an input signal to the input means of said earlier stage, only when said earlier stage is in said second stable state at the time of application of the last-mentioned input signal.

10. A binary scaler comprising a plurality of stages; an input means for the scaler associated with the first stage; each stage including a bi-stable circuit cyclically operable between a first and a second stable state, and an input means for each said circuit; and a carry means for each two successive stages interrelating said two stages; each said circuit comprising two voltage responsive variable light sources and two photoresponsive elements, one of said elements being connected electrically across one of said sources and being optically coupled to the other of said sources, the other of said elements being connected electrically to said other of said sources and being optically coupled to said one of said sources; said circuit input means comprising means for applying an input signal simultaneously across said one element and said one source in electrical series with respect thereto, and across said other element and said other source in electrical series with respect thereto; said light sources and photoresponsive elements of each said circuit cooperating in response to successive input signals applied to the respective circuit input means to effect said cyclical operation, one cycle of operation for each pair of input signals applied to said respective circuit input means; said first and second stable states being defined by different states of said light sources; each said carry means including a photoresponsive element optically coupled with said other of said light sources of the earlier of its respective two stages for providing an input signal to the circuit input means of the later of its respective two stages in response to an input signal applied to the circuit input means of said earlier stage, only when said earlier stage is in said second stable state at the time of application of the last-mentioned input signal; and all the carry means being connected together in electrical series, with respect to said signal input means for the scaler, whereby a signal input to said input means for the scaler is applied to successive circuit input means in accordance with the response of said carry means.

11. A binary scaler comprising a plurality of stages; an input means for the scaler associated with the first stage; each stage including a bi-stable circuit cyclically operable between a first and a second stable state in response to input signals thereto, and an input means for each said circuit; and a carry means for each two successive stages interrelating said two stages; each said circuit comprising a voltage responsive variable light means; and said first and second stable states being defined by different states of said light means; each said carry means including a photoresponsive element optically coupled with said light means of the earlier of its respective two stages for providing an input signal to the circuit input means of the later of its respective two stages in response to an input signal applied to the circuit input means of said earlier stage, only when said earlier stage is in said second stable state at the time of application of the last-mentioned input signal; all the carry means being connected together in electrical series, with respect to said signal input means for the scaler, whereby a signal input to said input means for the scaler is applied to successive circuit input means in accordance with the response of said carry means.

12. A multi-unit counter comprising at least three counting units, arranged in cascade relationship and adapted to register a count in binary notation of the number of input signals applied to an input for the multi-unit counter; each counting unit being a two stage, cyclically operable electro-optical device adapted to have operating voltage applied thereto, and comprising, first and second solid state electroluminescent elements each adapted to become and remain illuminated only when the voltage across the element exceeds a predetermined value, first and second circuits adapted to control the voltages across said elements and comprised, respectively, of first and second solid state photoconductors which are electrically coupled to said second and first elements, respectively, and which are optically coupled to said first and second elements, respectively, to receive light therefrom, at least said second photoconductor being electrically in parallel with the element to which the photoconductor is electrically coupled; counter input means adapted by at least applying successive input signals to said circuits of a first of said counting units to render said circuits of said first unit effective to produce operation cycles for said first unit device which are repetitive for every successive group of two successive signals, and in which, in any one cycle, said first element thereof is activated to be illuminated while said second element thereof is non-illuminated and said second element thereof is activated to be illuminated while said first element thereof is non-illuminated; and coupling means comprising additional solid state photoconductor means associated with at least each of said counting units after said first unit, said additional photoconductor means being electrically coupled to the elements of its respective counting unit for controlling the application of voltage to said elements, and said additional photoconductor means being optically coupled to only one element of that counting unit immediately preceding said respective counting unit, for effectively coupling an input signal into any given counting unit after the first unit only when said one element of each counting unit preceding said given unit is illuminated, said coupling means being adapted by said effective coupling of input signals to said counting units after the first unit to render said circuits of each counting unit after the first effective to produce operation cycles therefor which are repetitive for every successive group of two successive signals coupled thereinto, and in which, in any one cycle, said first element thereof is activated to be illuminated while said second element thereof is non-illuminated and said second element thereof is activated to be illuminated while said first element thereof is non-illuminated.

References Cited by the Examiner

UNITED STATES PATENTS

| | | | |
|---|---|---|---|
| 2,727,683 | 12/1955 | Allen | 250—209 |
| 2,900,522 | 8/1959 | Reis | 250—213 |
| 2,985,763 | 5/1961 | Ress | 250—208 |
| 3,107,301 | 10/1963 | Willard | 250—214 X |

RALPH G. NILSON, *Primary Examiner.*

RICHARD M. WOOD, MAX L. LEVY, GEORGE N. WESTBY, *Examiners.*

R. K. SCHAEFER, J. W. HUCKERT, W. STOLWEIN, *Assistant Examiners.*